P. A. BOWEN.
SEWING MACHINE.
APPLICATION FILED APR. 10, 1916.

1,250,272.

Patented Dec. 18, 1917.
6 SHEETS—SHEET 1.

Fig. 1.

Inventor.
Philip A. Bowen,
by Heard Smith & Tennant.
Attys.

P. A. BOWEN.
SEWING MACHINE.
APPLICATION FILED APR. 10, 1916.

1,250,272.

Patented Dec. 18, 1917.
6 SHEETS—SHEET 4.

Inventor.
Philip A. Bowen,
by Heard Smith & Tennant
Attys.

UNITED STATES PATENT OFFICE.

PHILIP A. BOWEN, OF LYNN, MASSACHUSETTS, ASSIGNOR TO LILLIAN A. LITTLE, OF LYNN, MASSACHUSETTS.

SEWING-MACHINE.

1,250,272.  Specification of Letters Patent.  Patented Dec. 18, 1917.

Application filed April 10, 1916. Serial No. 90,108.

*To all whom it may concern:*

Be it known that I, PHILIP A. BOWEN, a citizen of the United States, residing at Lynn, county of Essex, State of Massachusetts, have invented an Improvement in Sewing-Machines, of which the following description, in connection with the accompanying drawing, is a specification, like characters on the drawing representing like parts.

This invention relates to sewing machines for sewing shoes of that type which embody a horn on which the shoe is supported while being sewed, and the principal object of the invention is to provide a novel sewing machine of this type by which a so-called lock stitch can be formed. Other objects of the invention are to provide a novel lock stitch sewing machine of this type which is simple in construction, which has comparatively few working parts, and which is so constructed that the operative parts thereof are readily accessible. Other objects of the invention are to improve sewing machines of this type, all as will be more fully hereinafter set forth.

In my improved sewing machine the horn is provided with a thread-delivery eye through which the under thread is delivered and the upper thread is carried by a shuttle situated above the horn and above the work sustained by the horn. In the operation of stitching, a loop of the under thread is drawn up through the thread-delivery eye of the horn and through the work, and said loop is then interlocked with the shuttle thread and the under thread is acted upon by a take-up to set the stitch. The loop of under thread is drawn up through the work by means of a reciprocating hooked needle which is caused to penetrate the work and to engage the under thread beneath the work and then to be withdrawn thereby drawing a loop of under thread from the horn through the work. The interlocking of this loop of under thread with the shuttle thread is herein provided for by a looper device which takes the loop of under thread from the needle and casts it about the shuttle.

In order to give a better understanding of my invention, I have illustrated in the drawings a selected embodiment thereof which will now be described, after which the novel features will be pointed out in the appended claims.

The operative parts of the sewing machine are mounted on a frame 1 which may have any suitable construction adapted for this purpose. The horn of the sewing machine on which the work is supported is shown generally at 2, and this will preferably be mounted for rotation about a vertical axis as usual. For this purpose the horn is shown as secured to a bearing or hub member 3 which is rotatively mounted on a post 4 that is secured to and rises from a bracket 5 formed on the frame 1. This horn is provided in its tip with an opening 6 through which is delivered the under thread 7.

The upper thread 8 is drawn from a bobbin 180 carried by a shuttle 9 which may have any suitable or usual construction. This shuttle 9 is herein shown as open at its top to permit the bobbin to be placed therein and as provided with a thread-delivery eye 10 through which the upper thread is delivered, and it is mounted in a shuttle-carrier or shuttle-retainer 11 that is situated above the horn and above the work *w* (see Figs. 9, 15, 16 and 17). In the illustrated embodiment of my invention, the shuttle is a non-rotary shuttle, that is, it is stationary and merely rests in the shuttle retainer 11. The shuttle retainer is open at its top and is cut away at one side, as shown at 12, and it has such proportion relative to that of the shuttle that a loop 31 of the under thread 7 can be readily passed around the shuttle and drawn between the shuttle and the walls of the retainer thereby to interlock the under and shuttle thread.

In order to simplify the structure, I have herein shown the shuttle-retainer as mounted on the presser foot 13 which is situated above the tip 14 of the horn and rests on the work. The work *w*, it will be understood, is clamped between the presser foot and the tip of the horn during the formation of the stitch. This presser foot 13 is shown as hinged to the frame 1 at 15, the purpose of which construction will be presently described. As stated above, in the operation of forming the stitch in my improved sewing machine a loop of under thread 7 is drawn upwardly from the tip of the horn through the work *w* and is then cast over the shuttle 9 thereby causing it to be interlocked with the shuttle thread 8. This operation of drawing a loop of the under thread upwardly from the horn through the work is accomplished herein by means of a hooked needle 16. This needle is illustrated as sustained by a reciprocating needle bar 17 that is reciprocably mounted in a suitable guideway 18 formed in the head 19 of the sewing machine. The needle bar is given its reciprocation from a cam groove 20 formed in a cam member 21 by means of a lever 24 pivoted intermediate of its ends to the head at 25 and connected at one end to the needle bar 17 through a suitable link 26, the other end of said lever being provided with a roll 27 operating in the cam groove 20. The cam member 21 is mounted on a driving shaft 22 which may be driven in any suitable way, said shaft being herein shown as provided with a driving pulley 23 for this purpose. Any suitable clutch may be used to clutch the driving pulley 23 to the shaft. The needle-operating mechanism is such that when the needle is raised it is above the work *w*, but when it is moved downwardly, it will be forced through the work and the hooked end thereof will enter the opening 6 formed in the tip of the horn. The presser foot 13 is provided with an aperture 181 through which the needle operates and through which the thread passes.

Figure 11:
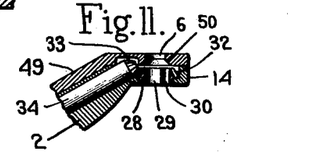
Fig. 11 is a section on the line *x—x*, Fig. 10, with the cap in position on the horn.
Figures 13, 14, 15, 16, 17, 18, 19, 20, 21, 22:
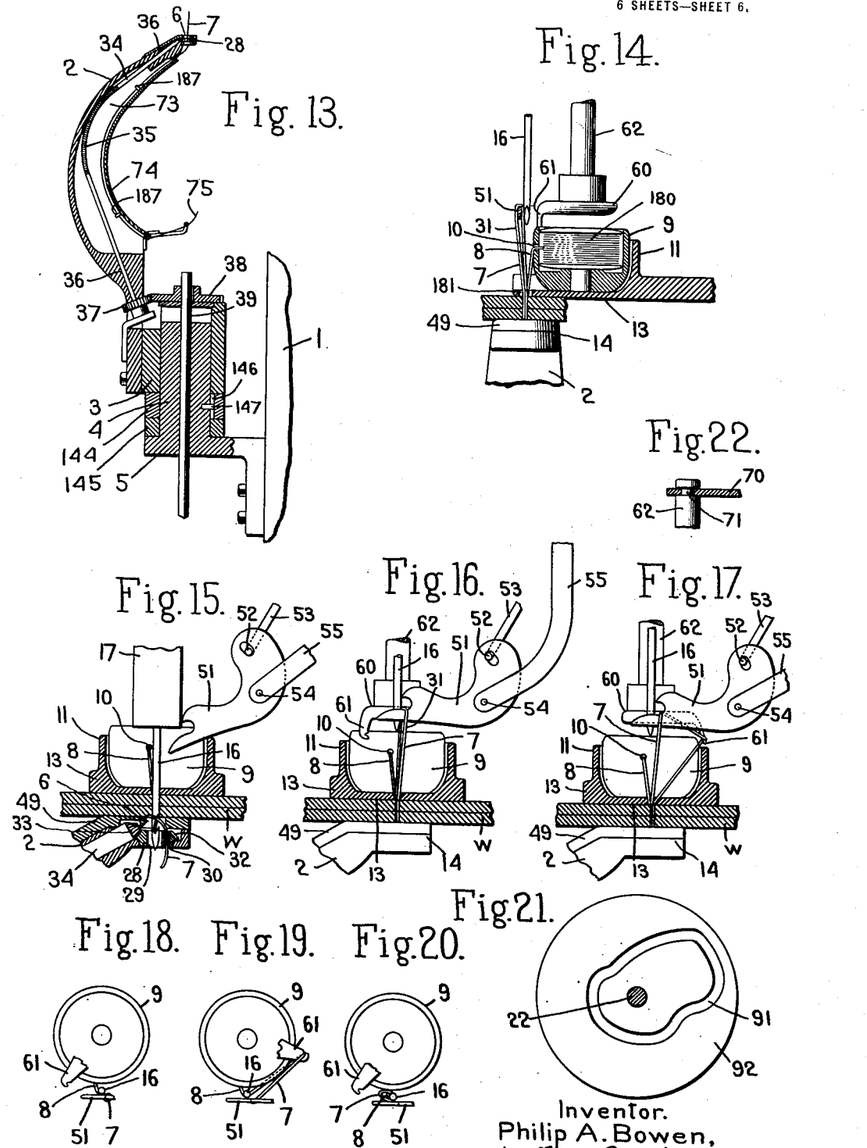
Fig. 13 is a vertical sectional view through the horn and its support.
Figs. 14, 15, 16 and 17 are views of the stitch-forming mechanism showing different positions of the parts during the formation of the stitch.
Figs. 18, 19 and 20 are plan views of the shuttle and looper showing the operation of the latter.
Fig. 21 is a view of the cam for operating the take-up.
Fig. 22 is a sectional detail view of the retainer for the shaft 62.

The horn is provided with suitable means by which the under thread 7 is looped about the needle when the latter has completed its penetrating thrust so that when the needle rises it will draw a loop of under thread through the work. While any suitable mechanism carried by the horn which is constructed to thus loop the under thread about the needle may be employed, I have herein shown for this purpose a rotatable looper member 28 which is mounted for rotation in the tip 14 of the horn. This looper member 28 is situated beneath the opening 6 and has a needle-receiving aperture 29 extending there-through which is in line with the opening 6. It also is provided with an eccentrically-situated thread-receiving eye 30 through which the under thread 7 passes, as shown in Fig. 11, said under thread passing thence through the opening 6 to the work. When the needle is in its lowered position the hook thereof will be in the position shown in Fig. 15. When the needle is in this position the rotation of the looper member 28 will carry the under thread about the needle, thus drawing said under thread into the hook of the needle. When the needle rises it will draw a loop 31 of the under thread through the work, as shown in Fig. 16.

Suitable mechanism is provided for giving rotative movement to the looper member 28 in timed relation with the reciprocations of the needle. This looper member may be constructed to rotate continuously in the same direction or may be made to oscillate so long as it is given a rotating movement in proper timed relation to the needle thereby to carry the under thread 7 about the needle and into the hook thereof at each penetrating thrust of the needle. In the embodiment of the invention herein shown mechanism is provided for giving rotation to the looper member 28 always in the same direction. Said looper member 28 is provided with beveled gear teeth 32 on its upper face which mesh with bevel gear teeth 33 carried by the end of a shaft 34. This shaft 34 is situated within the horn 2 and mechanism is provided for rotating the shaft from the driving shaft 22. The shaft 34 is provided intermediate of its ends with a flexible portion 35 and at its ends it is journaled in suitable bearings 36 formed in the horn 2, the flexible portion of the shaft permitting the latter to follow the contour of the horn. This shaft 34 has fast thereon a gear 37 which meshes with a gear 38 that is splined to a shaft 39 that extends vertically axially through the post 4. The shaft 39 is connected by beveled gears 40, 41 with a cross-shaft 42 journaled in suitable bearings 43 carried by the frame, and said shaft 42 is connected by bevel gears 44, 45 with a vertically-extending shaft 46 which carries at its upper end a bevel gear 47 meshing with a bevel gear 48 on the shaft 22. This gearing is so timed that the looper member 28 will make one rotation for each reciprocation of the needle.

The horn is provided at its tip with a removable cap piece 49 through which the opening 6 is formed and which covers the looper member 28. When this cap piece is removed, the looper member 28 is then accessible. The cap piece is cut away on its under side, as at 50, to give space to the under thread as the looper member makes its movement.

Figure 1:
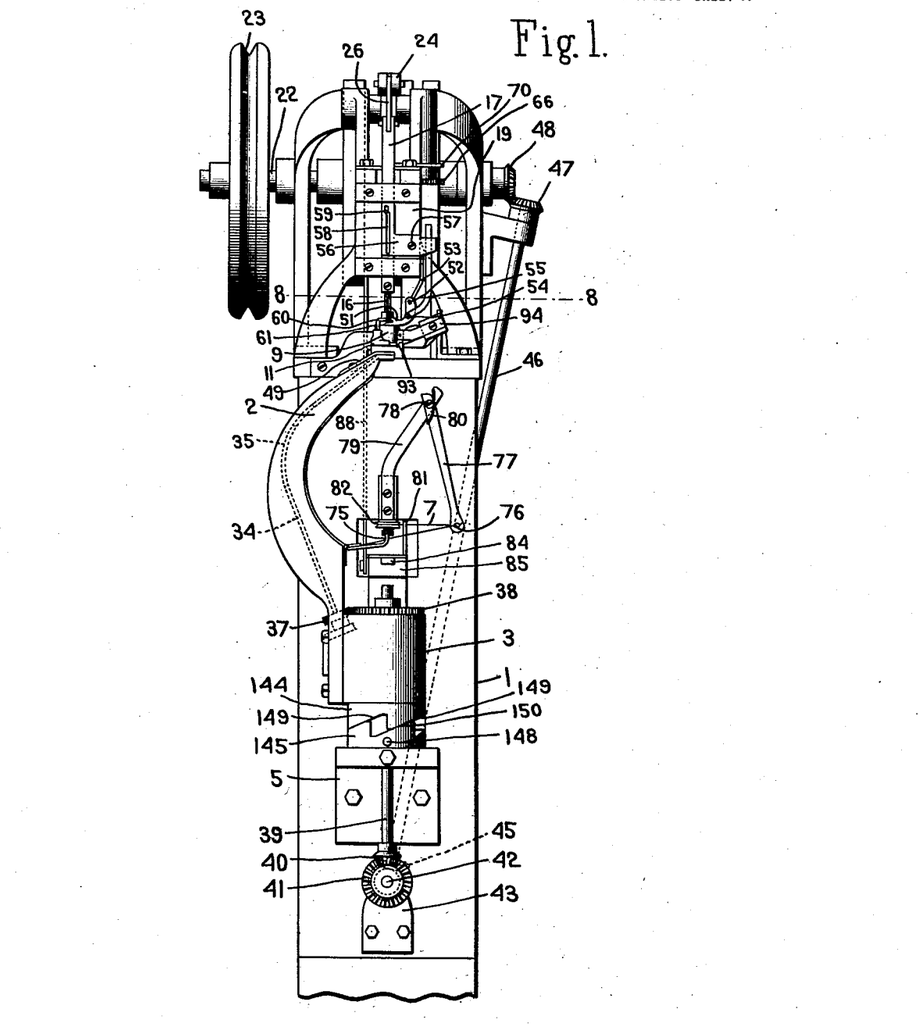
Figure 1 is a front view of a sewing machine embodying my invention.
Figure 2:
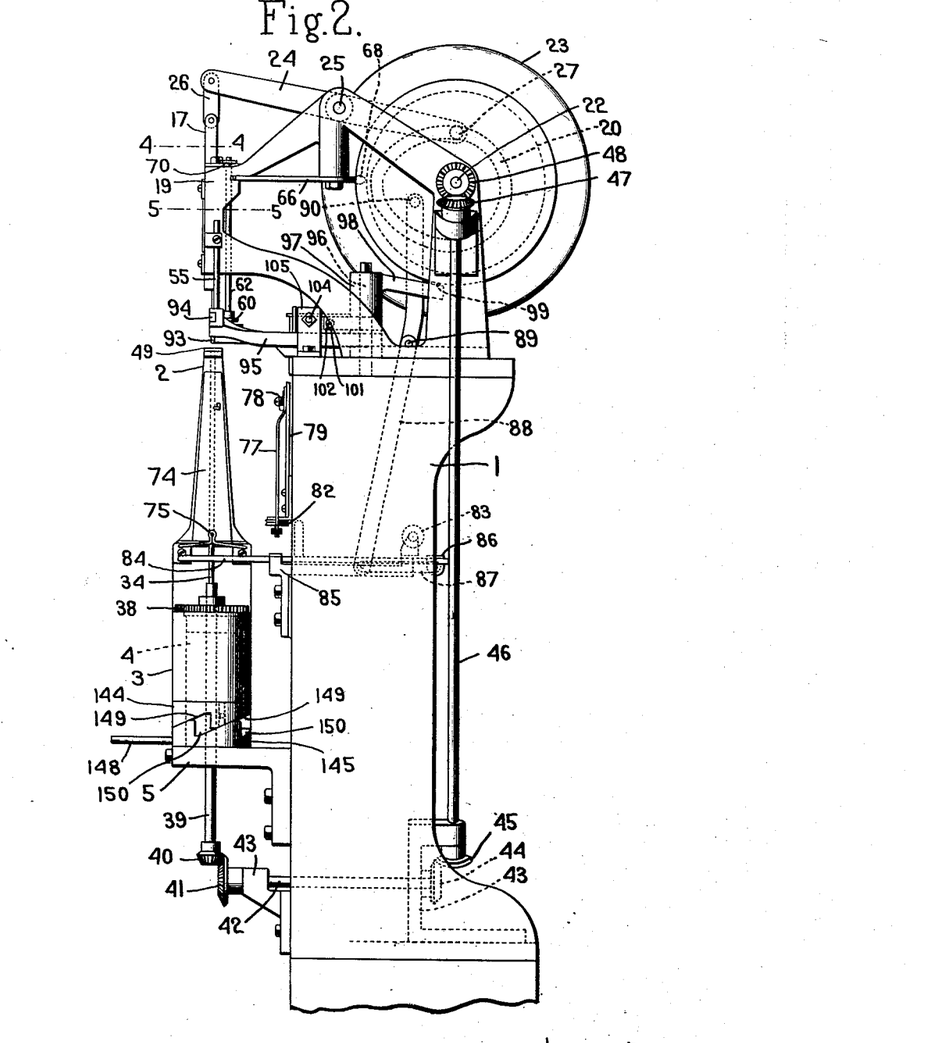
Fig. 2 is a side view thereof.

As stated above, after the loop 31 of under thread has been drawn up through the work by the needle 16, said loop is taken from the needle and is cast over the shuttle 9 thereby causing it to be interlocked with the shuttle thread. To effect this operation I have provided a loop retainer which enters the loop 31 and takes it from the needle, and have also provided a looper which coöperates with the loop retainer to throw said loop around the shuttle. The loop retainer is shown at 51 and it is pivotally mounted at 52 upon an arm 53 secured to the head 19 of the machine. Means are provided for reciprocating this loop retainer in timed relation with the movements of the needle to cause it to enter the loop 31 when the latter has been formed and then to withdraw from the loop when the latter has been shed over the shuttle. For this purpose the loop retainer has an arm 55 pivotally connected thereto at 54, which arm is connected to a rocking cam plate 56 pivoted at 57 to the head 19. This cam plate is provided with a cam groove 58 in which operates a pin 59 extending from the needle bar. The cam groove is so shaped that when the needle is in its lowered position the plate 56 will be turned to move the loop retainer toward the right, Fig. 1, thus carrying it out of the loop, as shown in Fig. 15, while when the needle is in its elevated position, as shown in Fig. 1, the loop retainer will be thrown forwardly to enter the loop. This is the position shown in Fig. 16. With this arrangement it will be seen that each time the needle is retracted thereby drawing a loop 31 through the work, the loop retainer will be thrown forwardly. The loop retainer is so positioned that during its forward movement it will enter the loop 31, as shown in Fig. 16, and take the loop from the needle.

The loop 31 is spread and shed over the shuttle 9 by means of a looper member 60 which is herein illustrated as a rotatable element situated directly above the shuttle and provided with a thread-engaging arm 61 so situated that as the looper rotates this arm will engage one side of the loop 31 and carry this side around the shuttle 9, as indicated in Figs. 17 and 19. The looper 60 makes a complete rotation, thus passing the loop 31 completely around the shuttle thereby causing the loop 31 to be interlocked with the shuttle thread 8. When the loop 31 has thus been passed around the shuttle, the slack in the loop is taken up by take-up mechanism thereby to set the stitch, as will be presently described.

Figure 4:
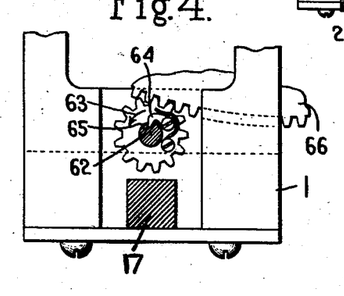
Fig. 4 is an enlarged section on the line 4—4, Fig. 2.
Figure 5:
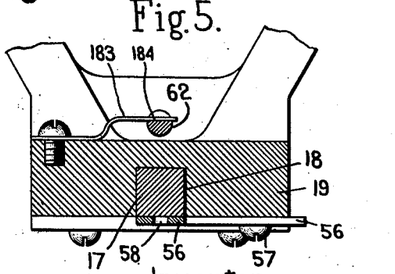
Fig. 5 is an enlarged section on the line 5—5, Fig. 2.

The looper 60 is herein shown as secured to a vertically-extending shaft 62 journaled in suitable bearings in the head. This shaft is held from vertical movement by means of a retainer 70 which engages a groove 71 formed in the shaft. Said retainer is pivoted to the frame at 72 to permit its being disengaged from the shaft. Any suitable mechanism for giving rotative movement to the shaft 62 may be employed without departing from the invention. I have herein shown for this purpose a gear 63 which is loosely mounted on the shaft 62 and which has pivotally connected thereto a spring pawl 64 adapted to engage a shoulder 65 formed in the shaft so that rotation of the gear in the direction of the arrow in Fig. 4 will give rotation to the shaft through the pawl 64 and shoulder 65. When the gear is rotated in the reverse direction, however, the pawl will be withdrawn from the shoulder and will give no rotation to the shaft 62. This gear 63 meshes with and is driven by a gear sector 66 which is pivoted on a stud 67 mounted in the head of the machine. This sector 66 has a projection 68 extending from the rear end thereof which operates in a cam groove 69 formed in the periphery of the cam element 21. This cam groove is so designed that at a certain point in each rotation of the cam, the gear sector 66 will be given a vibrating movement first in one direction and then in the other. The movement of the sector in a direction to rotate the gear 63 in the direction of the arrow, Fig. 4, will give rotation to the shaft 62, and thus to the looper 60, while the movement of the sector 66 and rotation of the gear 63 in the opposite direction will not give rotation to the shaft 62. The gearing is so designed that each movement of the sector is sufficient to rotate the shaft 62 through one complete revolution and hence when the sector receives its backward vibrating movement the gear 63 will be rotated backwardly through one complete revolution, thus to bring the pawl 64 into engagement with the shoulder 65 again.

The shaft 62 is held from backward rotation with the gear 63 by means of a spring arm 183 which engages a flat face 184 formed on the shaft. The spring permits the shaft to be turned by the gear when the latter is rotated in the direction of the arrow Fig. 4, but will hold the shaft from backward rotation when the gear is rotated backwardly.

Figure 6:
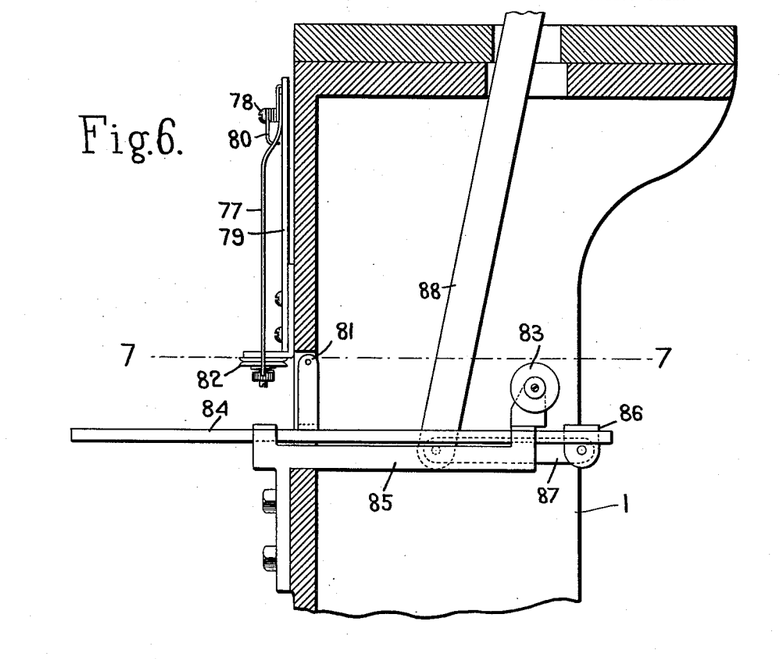
Fig. 6 is an enlarged view of the take-up mechanism.
Figure 7:
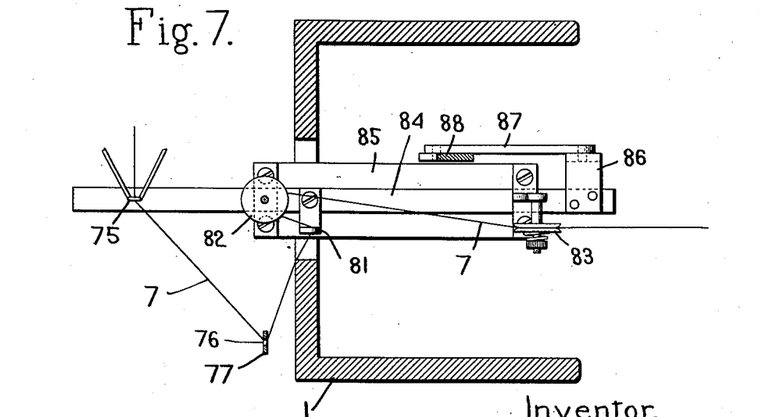
Fig. 7 is a section on substantially the line 7—7, Fig. 6.

I have above referred to the take-up mechanism which acts on the under thread to tighten the loop 31 after it has been cast over the shuttle and thereby to set the stitch. The horn 2 is provided with an opening 73 on one side which is closed by a plate 74. The course of under thread 7 from the work to the source of supply is as follows: From the work the thread passes through the eye 30 in behind and over the back side of the plate 74 which is provided with thread-guiding eyes 187, and then passes through a guide eye 75 carried by the horn near its lower end thereof. From this guide eye the thread passes through an eye 76 formed in the end of a tension arm 77 that is pivoted at 78 to a bracket 79 secured to the frame 1, said arm being acted upon by a suitable spring 80 which tends to keep it in the position shown in Fig. 1. From the eye 76 the thread 7 passes through an eye 81 on a take-up member and thence between tension disks 82 that are suitably sustained on the bracket 79. From these tension disks 82 the thread passes between two other tension disks 83 and thence to the source of supply. The eye 81 is carried by a reciprocating take-up bar 84 which is mounted to slide back and forth in suitable ways formed in a holder 85 to which the tension disks 83 are secured. This take-up bar is provided at its rear end with an arm 86 to which is connected a link 87 and said link is pivotally connected to the lower end of a lever 88 that in turn is pivoted to the frame at 89. The upper end of this lever is provided with a roll 90 operating in a cam groove 91 formed in the cam element 92 fast on the shaft 22. Since the eye 81 of the take-up acts on the thread 7 between the horn and the friction disks 82, 83, it will be seen that movement of the bar 84 to the right, Figs. 6 and 7, will operate to take up the slack in the loop 31 and set the stitch. The take-up is shown in Figs. 6 and 7 in the position which it occupies when the needle has been raised and has drawn a loop 31 of needle thread through the work. As the looper 60 engages one side of the loop 31 and carries said side around the shuttle, the take-up is moved forwardly slightly to the left in Fig. 7, thus giving up a little slack. As soon as the loop 31 has been thrown around the shuttle, then the take-up bar moves to the right, Figs. 6 and 7, thus causing the eye 81 to act on the thread 7 and not only take up the slack in the loop 31, but also to set the stitch. During this movement the strain on the thread pulls the tension arm 77 to the left. When the needle descends on its next penetrating thrust the take-up is moved to the left, thus giving up thread which is used in forming the loop 31 as the needle retracts. If there is not sufficient thread given up by the movement of the take-up to form the complete loop 31, thread will be drawn through the tension 82 and 83 from the source of supply.

The sewing machine herein illustrated also embodies a suitable feed mechanism by which the work is fed forward as the stitches are formed. The feeding device herein shown operates to give feeding movement to the work just after each stitch has been set and before the needle is moved downward for its next penetrating thrust. The work is fed forward by means of a feed dog 93 which is carried on an arm 94 secured to the end of a lever 95 that is pivotally mounted on a stud 96 rising from the frame. In order to simplify the construction I have provided means herein whereby the feed dog is given its vibrating movement from the same cam groove 69 that operates the looper. In order to accomplish this the stud 96 has pivotally mounted thereon a hub 97 from which extends an arm 98 carrying a roll 99 that operates in the cam groove 69. Said hub 97 also has integral therewith two fingers 100, 101 carrying adjustable screws 102 which are situated either side of a fin or flange 103 rising from the arm 95. The oscillating movement of the hub 97 due to the operation of the cam 69 will operate to give vibration to the feed lever 95 through the coöperation of the screws 102 and fin 103, as will be obvious. 104 is a stop screw screwed into a bracket 105 and which serves to limit the backward movement of the feed arm 95. The feed dog 93 is in constant engagement with the work and is so constructed that movement of the feed arm to the left, Figs. 1 and 8, will cause said dog to give feeding movement to the work, while movement in the opposite direction will allow the dog to slide over the work.

Figure 12:
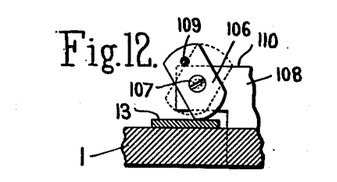
Fig. 12 is a section on the line 12—12, Fig. 8.

Since the work is clamped between the presser foot 13 and the horn tip, I have provided for releasing the pressure of the presser foot during the feeding movement, thus permitting the work to be readily fed and for clamping the presser foot against the work after the feeding movement and during the stitch-forming operation. This is accomplished by means of a locking cam 106, see Fig. 12, which is pivotally mounted at 107, to a bracket 108 carried by the frame 1. This cam has an opening through which extends a finger 109 that is rigidly secured to the hub 97 so that the oscillating movement of the hub will give rocking movement to the cam 106. The finger 109 rests on the upper edge 110 of the bracket 108 and is guided thereby. The cam 106 is so constructed that when it is in the full line position Fig. 12, it engages the presser foot 13, and holds the latter firmly in operative position. When, on the other hand, the cam 106 is turned into the dotted line position, Fig. 12, the pressure on the presser foot is relieved, this being the position of the parts during the feeding operation.

Figure 8:
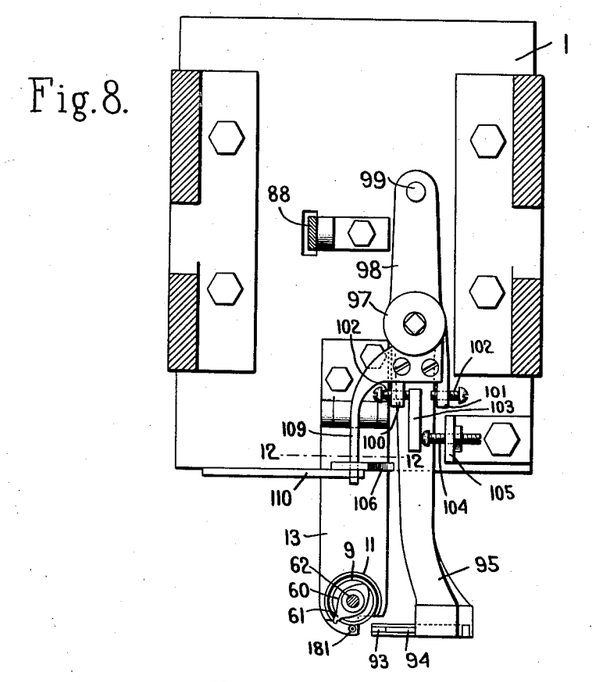
Fig. 8 is an enlarged sectional view on substantially the line 8—8, Fig. 1.
Figure 9:
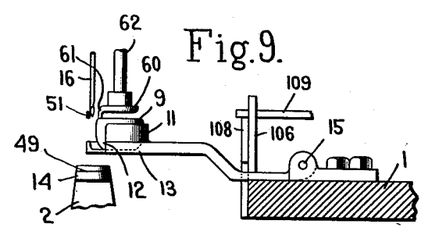
Fig. 9 is a detail view of the upper end of the horn, the shuttle, needle and the looper.
Figure 10:
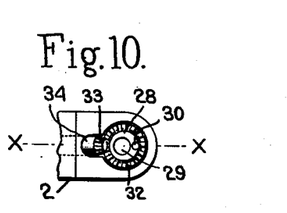
Fig. 10 is a plan view of the tip of the horn with the cap removed.

The parts are shown in Fig. 8 in the position they occupy when the work is clamped between the presser foot and the horn. As the hub 97 is turned to effect the feeding operation, the initial turning movement thereof will operate through the finger 109 to swing the cam 106 sufficiently to release its clamping pressure on the presser foot 13, and when this is accomplished the adjusting screw 102 will be brought against the fin 103 so that during further turning movement of the hub 97 the arm 95 will be moved thereby feeding the work forward. When the hub 97 is returned to its initial position the feeding dog will not only be returned to the position shown in Fig. 8, but the cam 106 will be actuated to clamp the presser foot again. The provision of the lost motion between the arm 101 and the fin 103 is for the purpose of insuring that the clamping pressure on the presser foot is relieved before the feed dog begins its feeding movement.

While the operation of the machine will be apparent from the above description, yet I will briefly summarize it as follows, having particular reference to Figs. 14 to 20.

Figure 3:
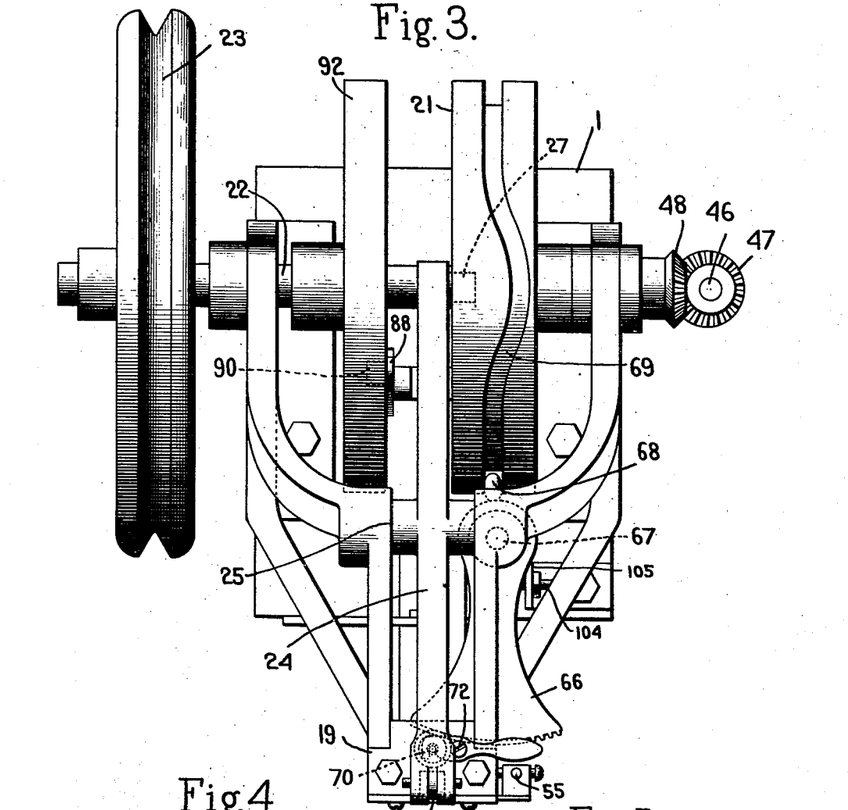
Fig. 3 is a top plan view.

When the machine has been brought to rest the needle 16 is raised and the parts are in the position shown in Fig. 14. When the machine is started the needle is given its penetrating thrust through the work and brought into the position shown in Fig. 15, and at this time the loop retainer 51 is moved backwardly into the position shown in Fig. 15 by the action of the pin 59 carried by the needle bar 17 in the slot 58. When the needle has been carried into the position shown in Fig. 15, the rotation of the looper element 28 carries the under thread 7 around the needle and into the hook thereof, as shown in Fig. 15. The needle then rises thereby drawing the loop 31 of under thread through the work $w$ and into a position above the shuttle 9. During this upward movement of the needle, the loop retainer 51 is moved forwardly and during its forward movement it enters the loop 31 and takes said loop from the needle. At this time the gear 66 is given a movement to the left, Fig. 3, by the cam groove 69, and during this movement the gear 63 is rotated through one complete rotation thereby rotating the shaft 62 and the looper 60. This rotative movement of the looper causes the finger 61 thereof to engage one side of the loop 31 and carry said loop about the shuttle 9, as shown in Fig. 17, the loop being at this time still retained upon the loop retainer 51. The coöperative movement of the loop retainer 51 and finger 61 thus carries the loop 31 entirely about the shuttle. The needle then starts to descend again and the loop retainer 51 is moved backwardly and withdrawn from the loop 31. The take up bar 84 is then moved backwardly, thus causing the take-up eye 81 to act on the under thread 7 and take up the slack in the loop 31. This action draws the loop around the shuttle between the shuttle and the wall of the shuttle retainer 11 and thus interlocks the loop 31 of under thread with the shuttle thread 8. This is illustrated in Fig. 20. The movement of the take-up is sufficient so that it not only takes up all the slack in the loop 31, but also draws said loop tight about the shuttle thread and thus sets the stitch. While the stitch is being set the cam groove 69 acts on the roll 99 thereby to turn the hub 97. The initial turning movement of the hub releases the cam 106 from the presser foot, thus relieving the pressure on the work, and further movement of the hub 97 operates the feeding arm 95 and feeding dog 93 thereby to feed the work forward. The feeding arm is immediately returned to its initial position and the cam 106 is immediately clamped against the presser foot again, and the above operations are then repeated. By having the projections 68 on the sector 66 and the roll 99 on the arm 98 properly spaced apart, it is possible to use the same cam groove 69 for operating both of these parts because the operations thereof are necessarily in sequence and the construction shown brings the parts in such relative position that the same cam will operate them successively in proper timed relation.

Provision is made for raising and lowering the horn on the post 4 to permit a shoe to be placed over the horn or to be removed therefrom. This is herein accomplished by two cam members 144 and 145 which are in the form of rings encircling the post 4. The cam member 144 is provided with a groove 146 in which operates a pin 147 extending from the post 4. The cam member 145 is loosely mounted on the post and is provided with a handle 148 by which it may be turned. These two cam members have coöperating cam or inclined faces 149 and 150 so constructed that when the cam member 145 is turned in one direction the cam member 144 will be raised. The hub 3 of the horn rests on the cam member 144 so that the turning of the cam member 145 will operate to raise the horn in its elevated position shown in the drawings. To depress the horn the cam member 145 is turned in the opposite direction. It will be remembered that the gear 38 is splined to the shaft 39, this construction being adopted to permit the gear to move longitudinally of the shaft with the hub 3 of the horn as the latter is raised and lowered.

While I have illustrated herein a selected embodiment of my invention, I do not wish to be limited to the constructional features shown.

I claim:

1. In a sewing machine, the combinatio with a work-supporting horn having u thread-delivery eye through which an under thread is delivered, of a vertically-movable presser foot adapted to rest on the work, a shuttle stationarily carried by the presser foot, a needle, needle-actuating mechanism to cause the needle to penetrate the work and draw a loop of the under thread up through the work, means to cast said loop about the shuttle, means to clamp the presser foot against the work while said loop is being drawn therethrough and then to release said presser foot, and means to feed the work while the presser foot is released.

2. In a sewing machine, the combination with a work-supporting horn having a thread-delivery eye through which an under thread is delivered, of a vertically-movable presser foot adapted to rest on the work, a shuttle stationarily carried by the presser foot, a needle, needle-actuating mechanism to cause the needle to penetrate the work and draw a loop of the under thread up through the work, means to cast said loop about the shuttle, means to clamp the presser foot against the work while said loop is being drawn therethrough and then to release said presser foot, and work-feeding means actuated by the means for clamping the presser foot and operative to feed the work when the presser foot is released.

3. In a sewing machine, the combination with a frame, of a work-supporting horn having a thread-delivery eye through which an under thread is delivered, a presser foot pivotally mounted on the frame for vertical movement, a shuttle carried by the presser foot, means to draw a loop of under thread from the horn through the work sustained thereon and to cast said loop about the shuttle, means to clamp the presser foot against the work while said loop of thread is thus being drawn therethrough and then to release said presser foot, and a feeding device actuated by the means for clamping the presser foot.

4. In a sewing machine, the combination with a frame, of a work-supporting horn having a thread-delivery eye through which an underthread is delivered, a presser foot pivotally mounted to the frame for vertical movement, a shuttle carried by the presser foot, means to draw a loop of under thread from the horn through the work sustained thereon and to cast said loop about the shuttle, means to clamp the presser foot against the work while said loop of thread is thus being drawn therethrough and then to release said presser foot, and means to feed the work while the presser foot is released.

5. In a sewing machine, the combination with a frame, of a work-supporting horn having a thread-delivery eye through which an under thread is delivered, a presser foot pivoted to the frame for vertical movement, a shuttle carried by said presser foot, means to draw a loop of under thread up through the work and to cast said loop about the shuttle, a lock for the presser foot to clamp the latter against the work, and a vibrating lock actuator constructed to move the lock into operative position while the loop is being drawn through the work and then to release the lock.

6. In a sewing machine, the combination with a frame, of a work-supporting horn having a thread-delivery eye through which an under thread is delivered, a presser foot pivoted to the frame for vertical movement, a shuttle carried by said presser foot, means to draw a loop of under thread up through the work and to cast said loop about the shuttle, a lock for the presser foot to clamp the latter against the work, a vibrating lock actuator constructed to move the lock into operative position while the loop is being drawn through the work and then to release the lock, and means to feed the work when said lock is released.

7. In a sewing machine, the combination with a frame, of a work-supporting horn having a thread-delivery eye through which an under thread is delivered, a presser foot pivoted to the frame for vertical movement, a shuttle carried by said presser foot, means to draw a loop of under thread up through the work and to cast said loop about the shuttle, a lock for the presser foot to clamp the latter against the work, a vibrating lock actuator constructed to move the lock into operative position while the loop is being drawn through the work and then to release the lock, and work-feeding means actuated by said vibrating actuator.

8. In a sewing machine, the combination with a frame, of a work-supporting horn having a thread-delivery eye through which an under thread is delivered, a shuttle situated above the horn, means to draw out a loop of under thread from the horn through the work supported thereon, a rotatable looper to engage said loop and cast it about the shuttle, work-feeding means, a driving shaft on the frame, and a cam having a single cam groove by which both the looper and the work-feeding means are actuated.

9. In a sewing machine, the combination with a frame, of a driving shaft thereon, a work-supporting horn having a thread-delivery eye through which an under thread is delivered, a presser foot pivoted to the frame, a shuttle sustained thereby, means to draw a loop of under thread from the horn through the work, a rotatable looper to engage said loop and cast it over the shuttle, means to lock the presser foot against the work while the loop is being drawn therethrough and then to release the presser foot, work-feeding means, a cam having a single cam groove, and connections between said cam and the looper, presser foot lock and work-feeding mechanism by which all three of the parts are actuated from said groove.

10. In a sewing machine, the combination with a work-supporting horn having a thread-delivery eye through which an under thread is delivered, of a vertically-movable presser foot adapted to rest on the work, a shuttle carried by said presser foot, a needle, needle-actuating mechanism to cause the needle to penetrate the work and draw a loop of under thread up through the work, a looper rotatable about a vertical axis and adapted to engage said loop and cast it about the shuttle, means to clamp the presser foot against the work while said loop is being drawn therethrough and then to release said presser foot, means to give the looper an intermittent rotative movement, and means to feed the work while the presser foot is released.

11. In a sewing machine, the combination with a work-supporting horn having a thread-delivery eye through which an under thread is delivered, of a vertically-movable presser foot adapted to rest on the work, a shuttle carried by said presser foot, a needle, needle-actuating mechanism to cause the needle to penetrate the work and draw a loop of under thread up through the work, a looper rotatable about a vertical axis and adapted to engage said loop and cast it about the shuttle, means to clamp the presser foot against the work while said loop is being drawn therethrough and then to release said presser foot, means to give the looper an intermittent rotative movement, and work-feeding means actuated by the means for clamping the presser foot.

12. In a lock stitch sewing machine, the combination with a horn having a thread-delivery eye, of a reciprocating hooked needle and means to reciprocate it, a shuttle, means carried by the horn to loop a thread about the needle when the latter has made its penetrating thrust, said needle when retracted drawing a loop of thread from the horn, a loop retainer to take the loop from the needle, and a looper rotatable in a horizontal plane to carry said loop about the shuttle.

13. In a lock stitch sewing machine, the combination with a horn having a thread-delivery eye, of a reciprocating hooked needle and means to reciprocate it, a shuttle, means carried by the horn to loop a thread about the needle when the latter has made its penterating thrust, said needle when retracted drawing a loop of thread from the horn, a loop retainer to take the loop from the needle, a looper rotatable in a horizontal plane to carry said loop about the shuttle, and a take-up acting on the looped thread to set the stitch.

14. In a sewing machine, the combination with a horn having a thread-delivery eye through which an under thread is delivered, of a shuttle sustained above the horn, means to draw out a loop of under thread from the horn, a loop-retainer to receive said loop, and a looper rotatable about a vertical axis and constructed to engage said loop and cast it over the shuttle.

15. In a lock-stitch sewing machine, the combination with a horn having a thread-delivery eye, of a hooked needle, means to reciprocate it, a shuttle, means carried by the horn to loop the under thread about the needle whereby the needle will draw a loop of under thread from the horn as it rises, a loop-retainer to take said loop from the needle, and a looper rotatable about a vertical axis and constructed to engage said loop and cast it about the shuttle.

16. In a sewing machine, the combination with a frame, of a horn having a thread-delivery eye through which an under thread is delivered, a presser foot, a shuttle carried stationarily by the presser foot, means to draw a loop of under thread through the material, and a looper rotatable about a vertical axis and constructed to engage said loop and cast it over the shuttle.

17. In a sewing machine, the combination with a frame, of a horn having a thread-delivery eye through which an under thread is delivered, a stationary shuttle situated above the horn, means to draw a loop of thread upwardly from the horn, a vertically-extending shaft journaled in said frame above the shuttle, a looper carried by said shaft, and means to rotate said shaft thereby to cause the looper to engage the loop and cast it over the shuttle.

18. In a sewing machine, the combination with a frame, of a horn having a thread-delivery eye through which an under thread is delivered, a shuttle situated above the horn, means to draw a loop of thread upwardly from the horn, a vertically-extending shaft journaled in said frame above the shuttle, a looper carried by said shaft, an oscillatory actuator, and connections between said actuator and shaft by which the oscillatory movement of the actuator gives periodic rotary movement to the shaft thereby to cause the looper to engage the loop and cast it about the shuttle.

19. In a sewing machine, the combination with a frame, of a horn having a thread-delivery eye through which an under thread is delivered, a shuttle situated above the horn, means to draw a loop of under thread upwardly from the horn, a vertically-extending shaft, a loop retainer to engage said loop, a vertically-extending shaft, and a looper carried thereby and adapted to coöperate with the loop retainer to cast said loop about the shuttle.

20. In a sewing machine, the combination with a frame, of a horn having a thread-delivery eye, a hooked needle, means to reciprocate it thereby to draw a loop of thread from the delivery eye of the horn through the material, a shuttle situated above the frame, a vertically-extending shaft above the shuttle, an oscillatory actuator, means to rotate the shaft during the movement of the actuator in one direction and to hold the shaft from rotation during the movement of the actuator in the opposite direction, and a looper carried by said shaft and adapted to engage the loop of thread and cast it over the shuttle.

In testimony whereof, I have signed my name to this specification.

PHILIP A. BOWEN.